United States Patent
Huang et al.

(10) Patent No.: US 10,416,011 B2
(45) Date of Patent: Sep. 17, 2019

(54) ELECTROMAGNETIC FLOWMETER WITH ADJUSTABLE ELECTRODE STRUCTURES

(71) Applicant: FINETEK Co., Ltd., New Taipei (TW)

(72) Inventors: Chien-Lung Huang, New Taipei (TW); Sheng-Shou Chen, New Taipei (TW); Yi-Liang Hou, New Taipei (TW); Chun-Ju Chen, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 143 days.

(21) Appl. No.: 15/785,307

(22) Filed: Oct. 16, 2017

(65) Prior Publication Data

US 2019/0113374 A1    Apr. 18, 2019

(51) Int. Cl.
*G01F 1/58*    (2006.01)

(52) U.S. Cl.
CPC .............. *G01F 1/584* (2013.01); *G01F 1/588* (2013.01)

(58) Field of Classification Search
None
See application file for complete search history.

(56) References Cited

U.S. PATENT DOCUMENTS

| | | | | |
|---|---|---|---|---|
| 3,813,938 A * | 6/1974 | Grosch | ............. | G01F 1/584 73/861.12 |
| 4,117,720 A * | 10/1978 | Simonsen | ............. | G01F 1/584 73/861.12 |
| 4,214,477 A * | 7/1980 | Schmoock | ............. | G01F 1/588 73/861.12 |
| 4,631,969 A * | 12/1986 | Schmoock | ............. | G01F 1/588 73/861.12 |
| 5,224,394 A * | 7/1993 | Kalinoski | ............. | G01F 1/584 73/861.12 |
| 5,773,723 A * | 6/1998 | Lewis | ............. | G01F 1/58 138/133 |
| 5,955,681 A * | 9/1999 | Hafner | ............. | G01F 1/584 73/861.17 |
| 6,611,775 B1 * | 8/2003 | Coursolle | ............. | G01D 3/032 702/65 |
| 2008/0078252 A1 * | 4/2008 | Graber | ............. | G01F 1/60 73/861.16 |
| 2016/0273948 A1 * | 9/2016 | Tower, III | ............. | G01F 1/60 |
| 2017/0322060 A1 * | 11/2017 | Sakata | ............. | G01F 1/586 |

* cited by examiner

*Primary Examiner* — Harshad R Patel
(74) *Attorney, Agent, or Firm* — Chun-Ming Shih; HDLS IPR Services

(57) ABSTRACT

An electromagnetic flowmeter includes a measurement tube having a mounting tube liner and a control module installed in an outer side of the measurement tube. A magnetic field module is installed in an outer side being orthogonal to a shaft of the measurement tube without contacting the working fluid. An electrode structure is disposed on an outer surface of the measurement tube and partially extended in the mounting tube liner to contact the working fluid. The actuator element is electrically connected with the control module and connected with the electrode structure. The actuator element is driven by an external force to drive the electrode structure toward the mounting tube liner inside and being orthogonal to the mounting tube liner for compensating the wear of the electrode structure so as to obtain a correct measurement result and increase the service life.

10 Claims, 6 Drawing Sheets

ELECTROMAGNETIC FLOWMETER WITH ADJUSTABLE ELECTRODE STRUCTURES

BACKGROUND OF THE INVENTION

Field of the Invention

The present invention generally relates to an electromagnetic flowmeter and, in particular to an electromagnetic flowmeter with adjustable electrode structures.

Description of Prior Art

An electromagnetic flowmeter usually measures a flow rate of a conductive fluid (such as water, etc.) by use of electromagnetic induction. The electromagnetic flowmeter is mainly composed of a measurement tube, a pair of electrode structures arranged on the measurement tube and a pair of coils. Additionally, a magnetic field is formed in the measurement tube and an electromotive force is generated between the electrode structures after the coils are energized. Therefore, the electromotive force of the magnetic field is changed when the fluid passes through the measurement body, and then the flow rate of the fluid can be calculated.

An electromagnetic flowmeter usually detects the fluid in the tube through the electrode structures. However, fluid in the tube might cause damages to detecting portions of the electrode structures. Therefore, failures or inaccuracies of measurement of the electromagnetic flowmeter might be occurred after using a considerable amount of time so that noises of the electronic signal are generated. In addition, metal shells of traditional electromagnetic flowmeter are mostly sealed by welding to avoid moisture penetration for ensuring normal operations of internal electrode structures and coils, but this welding process causes difficulty in replacing the electrode structures inside the metal shell. As a result, pipeline-related devices must be shut down to replace the electromagnetic flowmeter that results in disruptions of production, a lower capacity, and a high cost.

In view of the above drawbacks, the Inventor proposes the present invention based on his expert knowledge and elaborate researches in order to solve the problems of prior art.

SUMMARY OF THE INVENTION

Accordingly, an object of the present invention is to provide an electromagnetic flowmeter with adjustable electrode structures for compensating the wear of the electrode structures and adjusting the relative position of electrode structures; therefore, the flow field can be perpendicular to and orthogonal to the flow direction so as to maintain correct measurement results and reduce noises of the electronic signal so that the maintenance time can be shorten and the process will be simplified to maintain the capacity and increase the service life of the electromagnetic flowmeter.

In order to achieve the object mentioned above, the present invention provides an electromagnetic flowmeter with adjustable electrode structures including a measurement tube, a control module, a magnetic field module, an electrode structures and at least one actuator element. The measurement tube has a mounting tube liner for a working fluid flowing therein, and the control module is installed in an outer side of the measurement tube without contacting the working fluid. The magnetic field module is electrically connected with the control module and installed in a first outer side direction on an outer surface of the measurement tube and being orthogonal to a shaft of the measurement tube without contacting the working fluid. The magnetic field module is driven by an external force so as to generate an electromagnetic field in the mounting tube liner. The electrode structure is electrically connected with the control module and disposed in a second outer side direction on an outer surface of the measurement tube and being orthogonal to the measurement tube. The electrode structure is partially extended in the mounting tube liner. The actuator element is electrically connected with the control module and connected with the electrode structure. The actuator element is driven by an external force so as to take the electrode structure toward the mounting tube liner 11 inside and being orthogonal to a shaft of the mounting tube liner.

Comparing to the prior art, the actuator element of the present invention is electrically connected with the control module and electrode structures. The actuator element is driven by an external force to take one of the electrode structures toward the mounting tube liner 11 inside and being orthogonal to a shaft of the mounting tube liner for compensating the wear of the electrode structure so as to obtain a correct measurement result and increase service life. Furthermore, the position of the electrode structure on the measurement tube can be adjusted depends on actual situations; thus the flexibility of the electromagnetic flowmeter will be enhanced.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
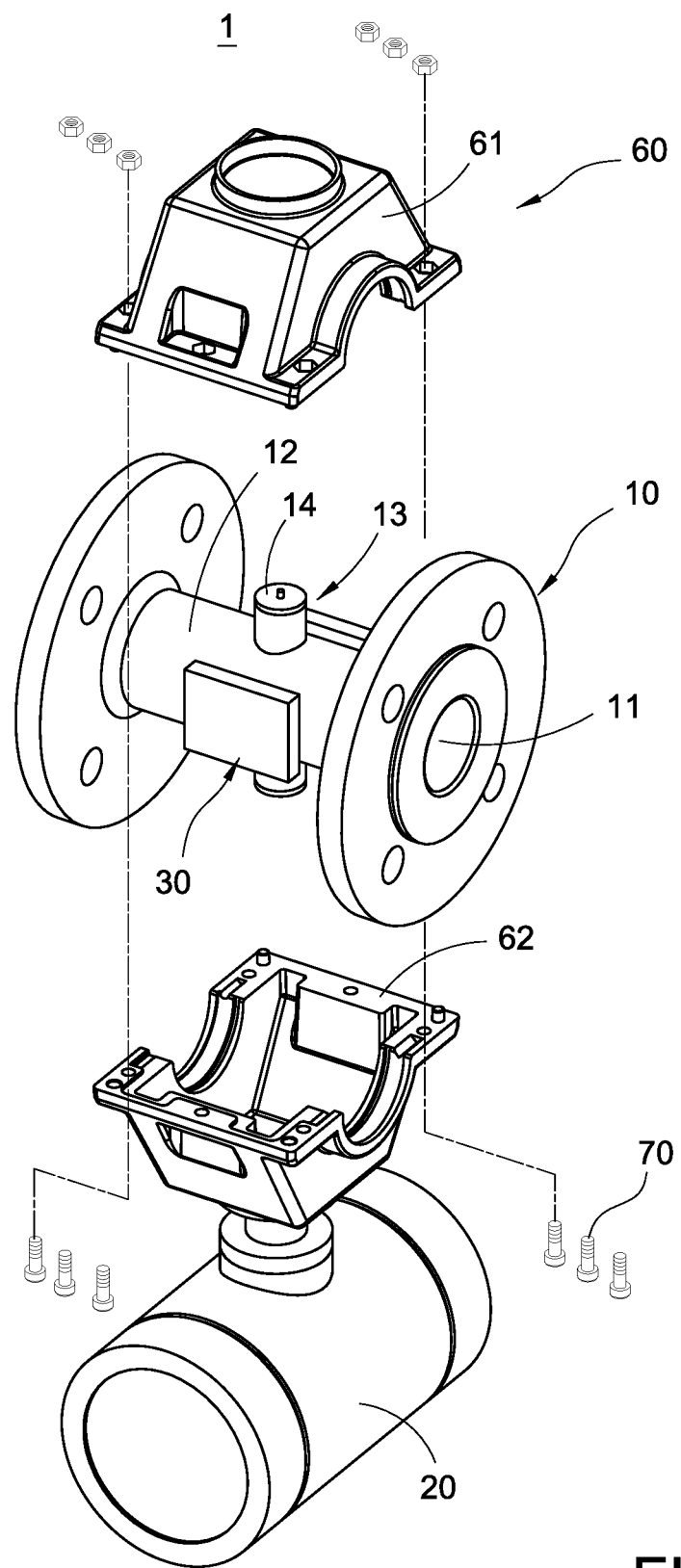
FIG. 1 is an explosion schematic view of electromagnetic flowmeter with adjustable electrode structures of the present invention.
Figure 2:
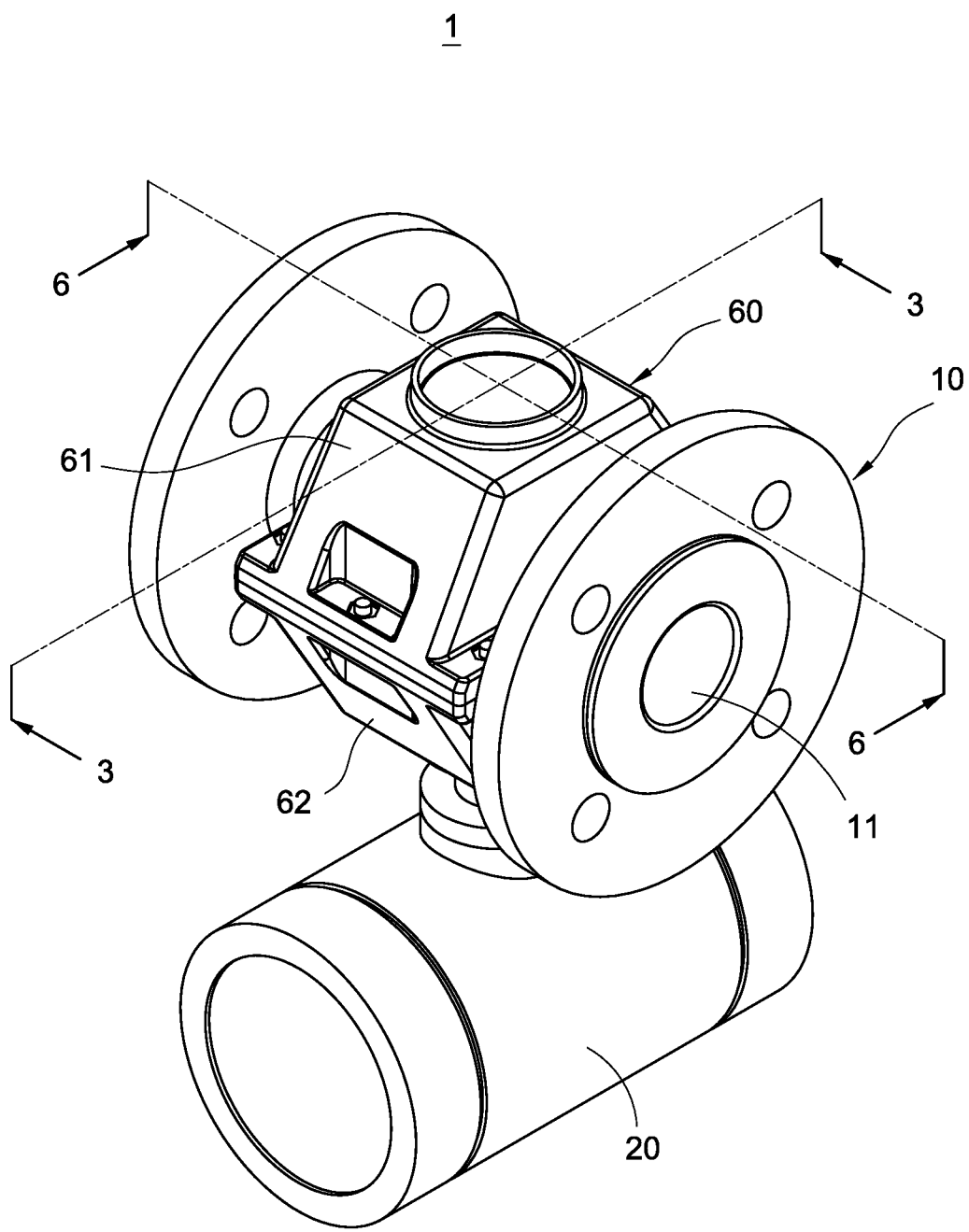
FIG. 2 is a perspective schematic view of electromagnetic flowmeter with adjustable electrode structures of the present invention.
Figure 3:
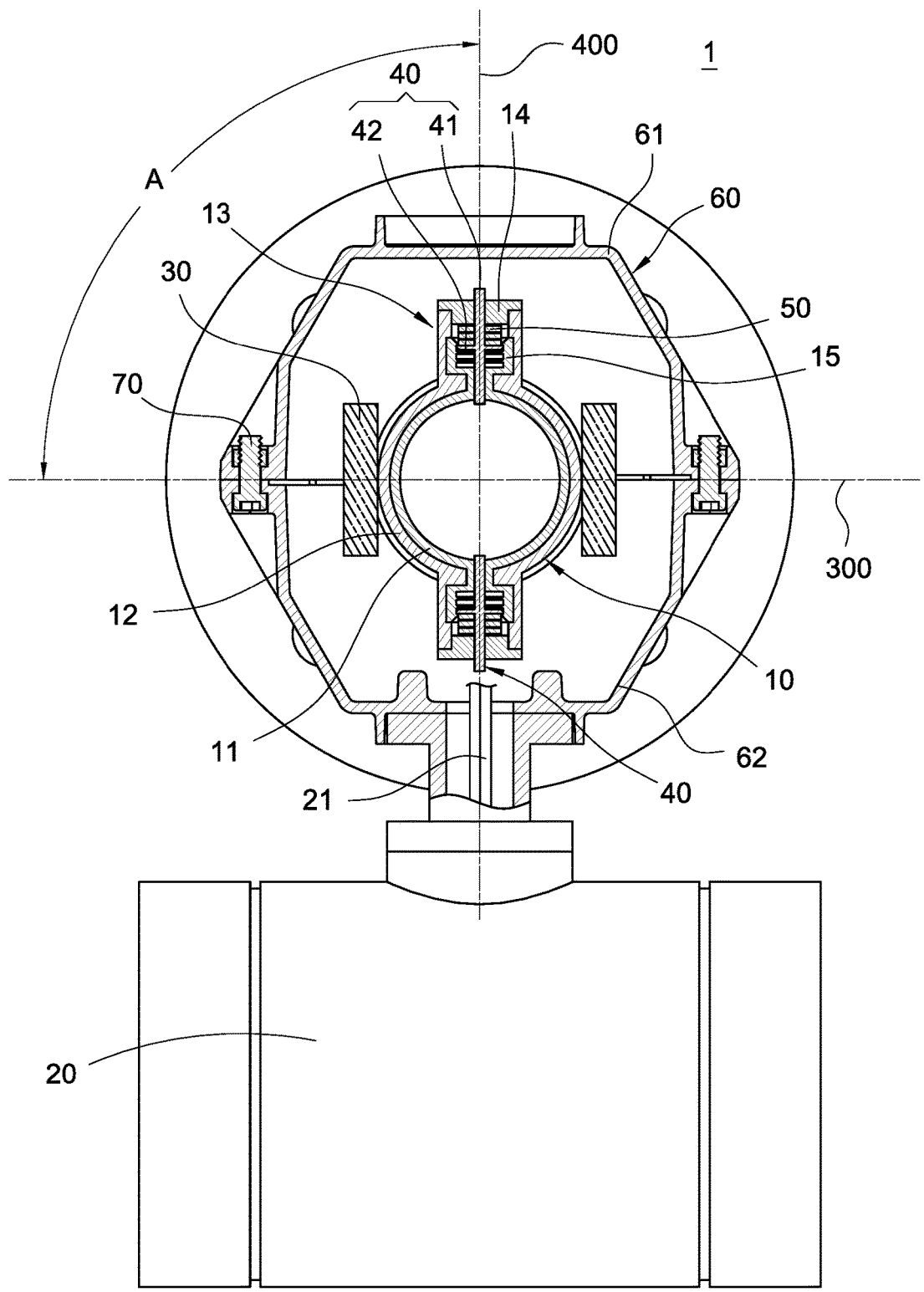
FIG. 3 is a cross sectional view of FIG. 2 along line 3-3.

Please refer to FIG. 1 to FIG. 3, which depict a perspective explosion schematic view, a perspective schematic view and a cross sectional view of one side of the electromagnetic flowmeter with adjustable electrode structures. The electromagnetic flowmeter 1 with adjustable electrode structures includes a measurement tube 10, a control module 20, a magnetic field module 30, an electrode structure 40 and at least one actuator element 50. The magnetic field module 30 and the electrode structure 40 are fixed on two opposite sides of the measurement tube 10 separately. Moreover, the control module 20 controls the magnetic field module 30, the electrode structure 40 and the actuator element 50. Thereby, the electromagnetic flowmeter 1 can measure the flow rate of the fluid in the measurement tube 10, and the distance of the electrode structure 40 extended in the measurement tube 10 can be adjusted by the driving of the actuating element 50. The structures of the electromagnetic flowmeter 1 are described more detail as follows.

As shown in FIG. 1, the measurement tube 10 has a mounting tube liner 11 for a working fluid flowing therein, and the control module 20 is installed in an outer side of the measurement tube 10. In addition, the magnetic field module 30 is electrically connected with the control module 20 and installed in a first outer side direction 300 on an outer surface of the measurement tube 10 and being orthogonal to a shaft of the measurement tube 10 without contacting the working fluid. The magnetic field module 30 is driven by an external force and controlled through the control module 20 so as to generate an electromagnetic field in the mounting tube liner 11. In the present embodiment, the magnetic field module 30 includes a pair of magnetic sheets.

Moreover, the electrode structure 40 is electrically connected with the control module 20 and disposed in a second outer side direction 400 on an outer surface of the measurement tube 10 and being orthogonal to a shaft of the measurement tube 10. The electrode structures 40 is partially extended in the mounting tube liner 11 to contact the working fluid. Furthermore, in the present embodiment, the electromagnetic flowmeter 1 includes a pair of electrode structures 40 and combined on two sides of the measurement tube 10 separately. The actuator element 50 is electrically connected with the control module 20 and at least one of the electrode structures 40. The actuator element 50 is driven by an external force to take at least one of the electrode structures 40 toward the mounting tube liner 11 inside and being orthogonal to a shaft of the mounting tube liner 11 (second outer side direction 400) for compensating the wear of the electrode structure 40 so as to obtain a correct measurement result.

It should be noted that, the first outer side direction 300 and the second outer side direction 400 forms an angle A on an orthogonal plane of a flowing direction of the working fluid. The angle A is, but limited to, 90 degrees. Besides, the external force is a driving force produced by electricity, magnet, light, or acoustic; or the external force is an external mechanical force driving the pair of electrode structures to move.

Please refer to FIG. 3, in an embodiment of the present invention, the measurement tube 10 further includes a mounting tube 12 sleeved on the mounting tube liner 11. The mounting tube 12 has two mounting portions 13 disposed oppositely, and each of the two mounting portions 13 has a through hole communicated with the mounting tube liner 11 individually. The pair of electrode structures 40 are provided in the two mounting portions 13 correspondingly and extended in the mounting tube liner 11 through the through holes.

Moreover, each of the electrode structures 40 has an electrode probe 41 and a carrying board 42 disposed around an outer periphery of the electrode probe 41. Theactuator element 50 is disposed on the carrying board 42. Besides, the measurement tube 10 further includes two end caps 14 covering the two mounting portions 13 correspondingly and a restraint seat 15 formed in the mounting portions 13. The restraint seat 15 is integrally formed with the mounting tube liner 11 and provided with the through hole. In more detail, each of the pair of the electrode structures 40 connects with an actuator element 50 individually. The control module 20 further includes a cable 21. The actuator element 50 is controlled by the control module 20 through the cable 21 to take the electrode structures 40 moving.

It is worth of notice that, the quantity of the electrode structures 40 and the mounting portions 13 can be adjusted depending on actual situations.

In the present embodiment, the electromagnetic flowmeter 1 further includes a protection shell 60 and a plurality of fastening elements 70. The protection shell 60 connects with the control module 20 and covers the measurement tube 10. More specially, the protection shell 60 includes a first shell 61 and a second shell 62 covered each other. The first shell 61 and the second shell 62 are combined with the measurement tube 10 correspondingly through the fastening elements 70.

Figure 4:
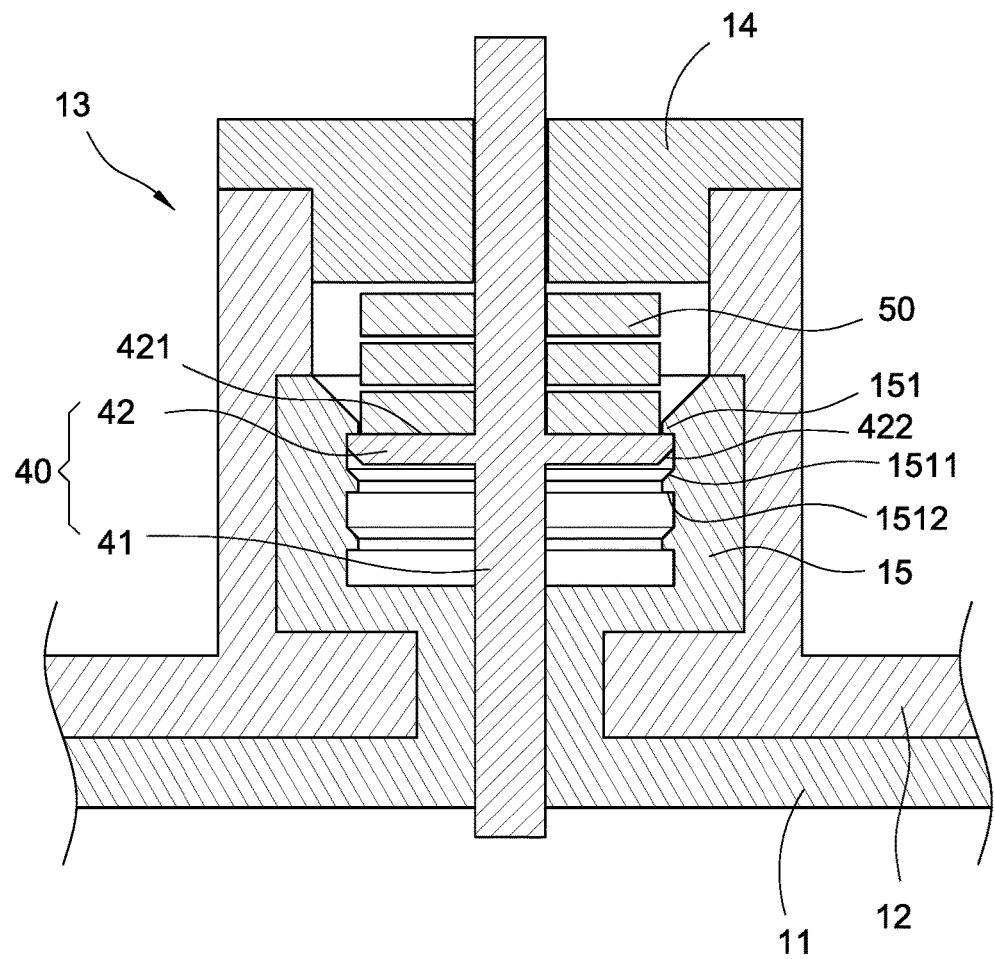
FIG. 4 is a cross sectional view of mounting portions of electromagnetic flowmeter of the present invention.
Figure 5:
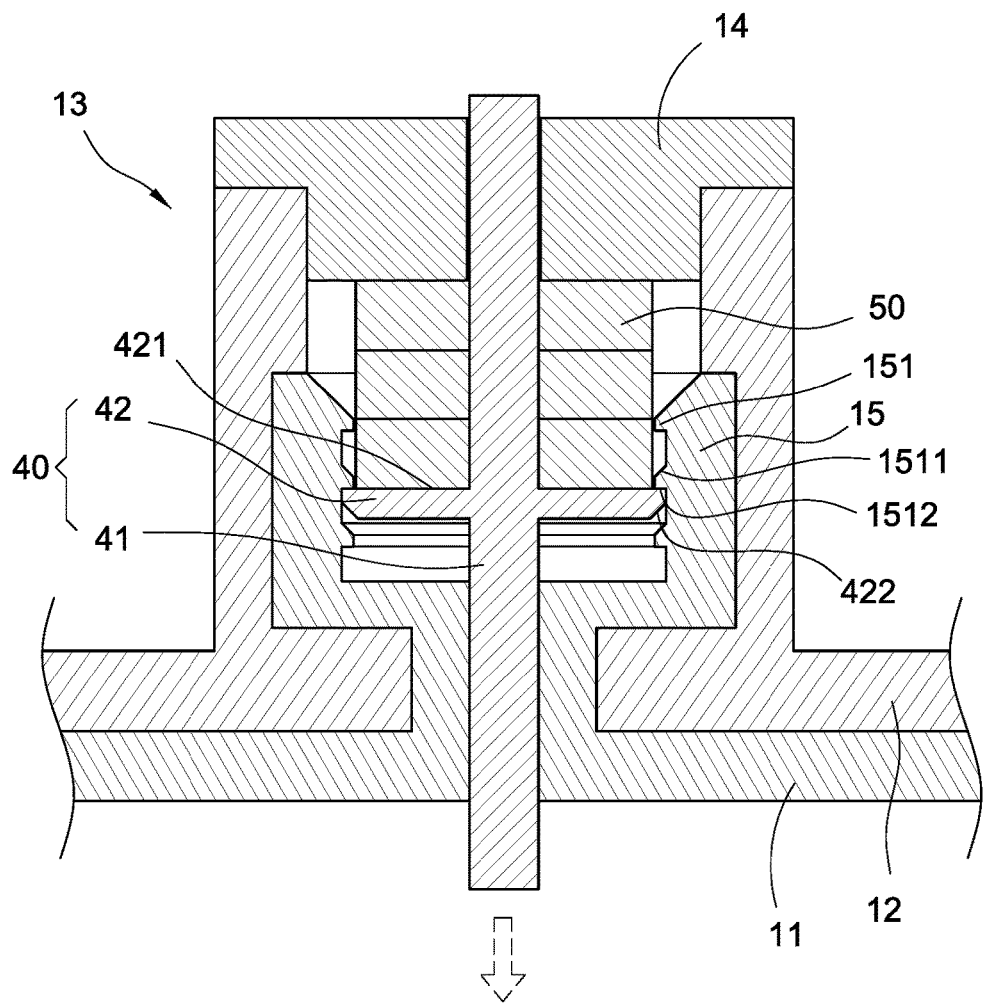
FIG. 5 is an adjustment schematic view of electrode structures of electromagnetic flowmeter of the present invention.

Please refer to FIG. 4 and FIG. 5, they depict a cross sectional schematic view of mounting portions and adjustment schematic view of electrode structures of an embodiment of the present invention. As shown in FIG. 4, in the present embodiment, preferably, the actuator element 50 is a piezoelectric element set, and two sides of the piezoelectric element set resist against the end cap 14 and the carrying board 42 respectively, wherein the piezoelectric element set is a combination of conventional piezoelectric materials and ceramic insulating materials. The piezoelectric element set is driven by an external force to deform, and the carrier board 42 is pushed to move the electrode structures 40 toward the mounting tube liner 11 inside and being orthogonal to a shaft of the mounting tube liner 11. Whereby, the purpose of adjusting the position of the electrode structure 40 is achieved.

It is worth of notice that, in the present embodiment, an inner wall of the restraint seat 15 has a plurality of positioning portions 151, and the carrier board 42 is positioned at one of the positioning portions 151 by the driving of the actuating element 50. The deposition of the positioning portions 151 can maintain the tightness between the carrier board 42 and the restraint seat 15 to prevent the carring board 42 from moving in a direction away from the mounting tube liner 11.

Specifically, the positioning portion 151 is a hook. The carrying board 42 has a flat contacting face 421 and an inclined face 422 neighboring a side of the positioning portion 151. In addition, the hook has a tilted guide face 1511 corresponding to the inclined face 422 and a flat stopper face 1512 being capable of resisting the carrying board 42. In further, when the carrying board 42 moves toward the inner bottom of the restraint seat 15 by the driving of the actuator element 50, the inclined face 422 of the carrying board 42 moves toward another positioning portion 151 on the inner side by the guide of the inclined face 1511. Therefore the flat contacting face 421 of the carrying board 42 can be positioned on the flat stopper face 1512 of the positioning portion 151 on the inner side. Accordingly, the position of the electrode structure 40 extended in the mounting tube liner 11 is adjusted.

With referring to FIG. 5, when the piezoelectric element set is deformed by the driving of an external force, the carrier board 42 will be pushed and moved toward the center of the measurement tube 10. At the moment, the carrying board 42 moves toward the inner bottom of the restraint seat 15 by the pushing of the piezoelectric element set and located at another positioning portion 151 on the inner side. Therefore, the electrode structures 40 (the electrode probe 41 and the carrier board 42) moves toward the mounting tube liner 11 inside and being orthogonal to a shaft of the mounting tube liner 11; thereby the purpose of adjusting the position of the electrode structure 40 will be achieved.

Figure 6:
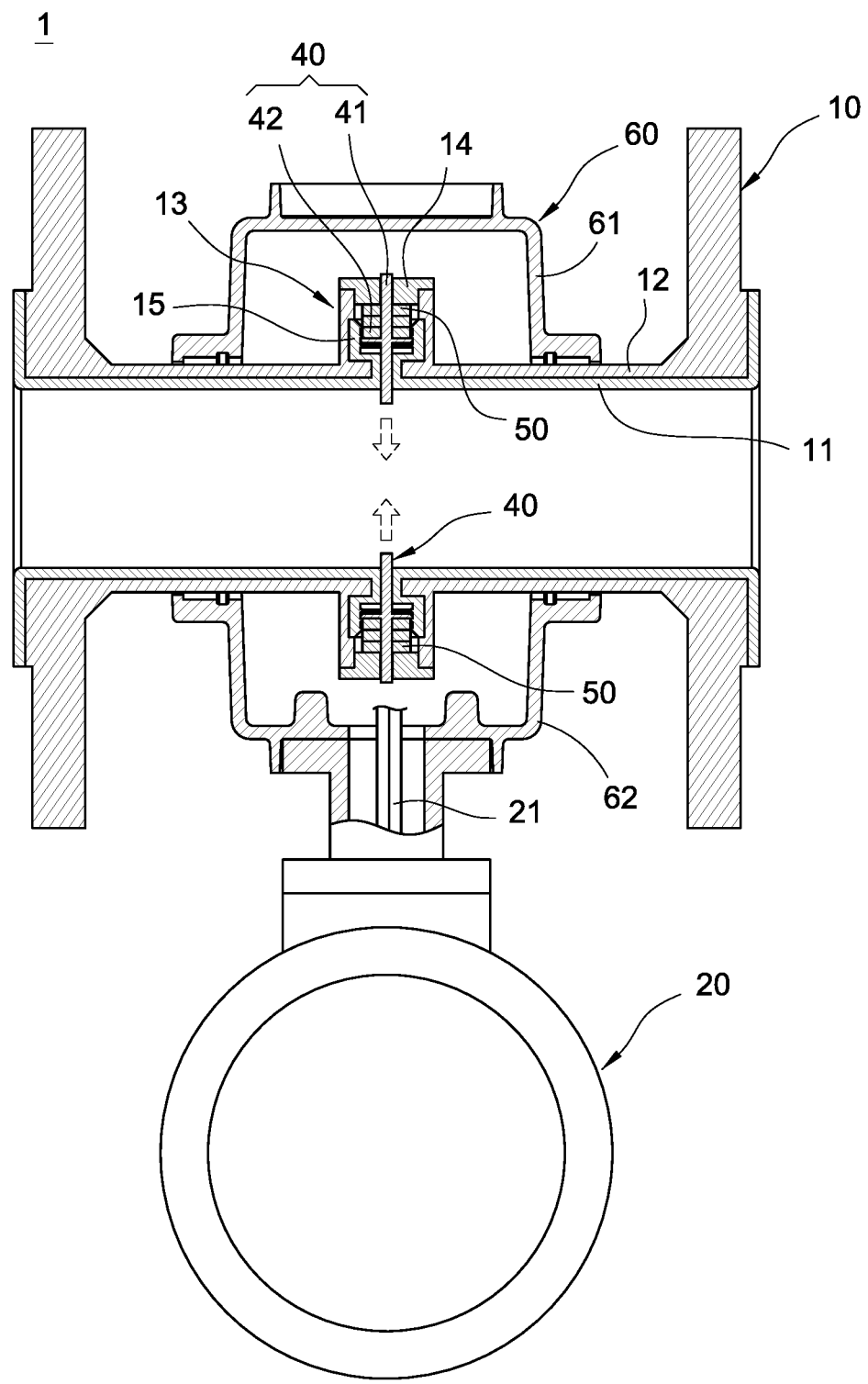
FIG. 6 is a cross sectional view of FIG. 2 along line 6-6.

Please further refer to FIG. 6, it depicts a schematic view of the movement of the electrode structure of electromagnetic flowmeter of the present invention. In the present invention, the electrode structures 40 on two sides of the measurement tube 10 are connected with an actuating element 50 (the piezoelectric element set) separately. The two actuating elements 50 are controlled by the control module 20 and take the connected electrode structures 40 moving.

When the pair of electrode structures 40 are damaged so that mistakes or inaccuracies are happened during measurements, the electromagnetic flowmeter 1 of the present invention can control the driving of the actuating elements 50 through the control module 20 for adjusting the position of the electrode structure 40 extending in the measurement tube 10. In real practice, the position of the electrode structures 40 can be adjusted depends on actual situations; thus the flexibility and service life of the electromagnetic flowmeter 1 are increased.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. An electromagnetic flowmeter with adjustable electrode structures, comprising:
a measurement tube having a mounting tube liner for a working fluid flowing therein;
a control module installed in an outer side of the measurement tube without contacting the working fluid;
a magnetic field module electrically connected with the control module and installed in a first outer side direction on an outer surface of the measurement tube and being orthogonal to an axis of the measurement tube without contacting the working fluid; the magnetic field module driven by an external force so as to generate an electromagnetic field with respect to the mounting tube liner;
an electrode structure electrically connected with the control module and disposed in a second outer side direction on an outer surface of the measurement tube and being orthogonal to the axis of the measurement tube; the electrode structure partially extended in the mounting tube liner to contact the working fluid; and
at least one actuator element electrically connected with the control module and connected with the electrode structure; the actuator element driven by an external force so that the electrode structure is moved toward the mounting tube liner inside and being orthogonal to an axis of the mounting tube liner;
wherein, the measurement tube further includes a mounting tube sleeved on the mounting tube liner; wherein, the mounting tube has a mounting portion; the mounting portion has a through hole communicated with the mounting tube liner, and the electrode structure is provided in the mounting portion and extended in the mounting tube liner through the through hole; the electrode structure has an electrode probe and a carrying board disposed around an outer periphery of the electrode probe; the measurement tube further includes an end cap covering the mounting portion and a restraint seat formed in the mounting portion: the actuator element is a piezoelectric element set, and two sides of the piezoelectric element set resist against the end cap and the carrying board respectively; the piezoelectric element set is driven by an external force to deform and the carrying board is pushed to move the electrode structure toward the mounting tube liner inside and being orthogonal to the axis of the mounting tube liner.

2. The electromagnetic flowmeter according to claim 1, wherein, the actuator element is disposed on the carrying board.

3. The electromagnetic flowmeter according to claim 2, the restraint seat is integrally formed with the mounting tube liner and provided with the through hole.

4. The electromagnetic flowmeter according to claim 3, wherein an inner wall of the restraint seat has a plurality of positioning portions; the carrying board is driven by the actuator element and positioned at one of the positioning portions.

5. The electromagnetic flowmeter according to claim 4, wherein the positioning portion is a hook; the carrying board has a flat contacting face and an inclined face neighboring a side of the carrying board; the hook has a tilted guide face corresponding to the inclined face and a flat stopper face is capable of resisting the carrying board.

6. The electromagnetic flowmeter according to claim 1, wherein the first outer side direction and the second outer side direction forms an angle on an orthogonal plane of a flowing direction of the working fluid.

7. The electromagnetic flowmeter according to claim 1, further including a protection shell, wherein the protection shell connects with the control module and covers the measurement tube.

8. The electromagnetic flowmeter according to claim 7, further including a plurality of fastening elements, wherein the protection shell includes a first shell and a second shell combined together; the first shell and the second shell are combined with the measurement tube correspondingly through the fastening elements.

9. The electromagnetic flowmeter according to claim 1, wherein there are a pair of electrode structures and a pair of actuator elements; the actuator elements are controlled by the control module to drive the electrode structures move, respectively.

10. The electromagnetic flowmeter according to claim 1, wherein the external force is a driving force produced by electricity, magnet, light, or acoustic; or the external force is an external mechanical force driving the pair of electrode structure to move.

* * * * *